(12) United States Patent
Yoshimura et al.

(10) Patent No.: US 9,644,055 B2
(45) Date of Patent: May 9, 2017

(54) METHOD FOR PRODUCING AQUEOUS FLUORINE-CONTAINING POLYMER DISPERSING ELEMENT, AND PURIFIED AQUEOUS FLUORINE-CONTAINING POLYMER DISPERSING ELEMENT

(71) Applicant: DAIKIN INDUSTRIES, LTD., Osaka-shi, Osaka (JP)

(72) Inventors: Takashi Yoshimura, Settsu (JP); Kazuhiro Ohtsuka, Settsu (JP); Tadashi Ino, Settsu (JP); Noriyuki Shinoki, Settsu (JP); Masahiro Kondo, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 43 days.

(21) Appl. No.: 14/403,033

(22) PCT Filed: May 22, 2013

(86) PCT No.: PCT/JP2013/064245
§ 371 (c)(1),
(2) Date: Nov. 21, 2014

(87) PCT Pub. No.: WO2013/176185
PCT Pub. Date: Nov. 28, 2013

(65) Prior Publication Data
US 2015/0148482 A1    May 28, 2015

(30) Foreign Application Priority Data
May 23, 2012    (JP) .................................. 2012-117663

(51) Int. Cl.
| C08F 216/14 | (2006.01) |
| C08F 8/26 | (2006.01) |
| C08F 8/12 | (2006.01) |
| C08F 6/02 | (2006.01) |
| C08F 14/18 | (2006.01) |
| C08F 6/16 | (2006.01) |
| C08F 2/24 | (2006.01) |
| B01D 71/32 | (2006.01) |
| H01M 8/1025 | (2016.01) |
| H01M 8/1039 | (2016.01) |
| B01D 69/02 | (2006.01) |

(52) U.S. Cl.
CPC .......... *C08F 216/1466* (2013.01); *C08F 2/24* (2013.01); *C08F 6/02* (2013.01); *C08F 6/16* (2013.01); *C08F 8/12* (2013.01); *C08F 8/26* (2013.01); *C08F 14/18* (2013.01); *B01D 69/02* (2013.01); *B01D 71/32* (2013.01); *B01D 2325/14* (2013.01); *C08F 2216/1475* (2013.01); *H01M 8/1025* (2013.01); *H01M 8/1039* (2013.01)

(58) Field of Classification Search
CPC ..... B01J 39/18; C08F 8/26; C08F 6/16; C08F 2216/1475
See application file for complete search history.

(56) References Cited

U.S. PATENT DOCUMENTS

| 7,304,101 B2 * | 12/2007 | Hintzer ................. C08F 214/18 523/310 |
| 2002/0193500 A1 | 12/2002 | Hintzer et al. |
| 2004/0167236 A1 | 8/2004 | Grootaert et al. |
| 2006/0014886 A1 | 1/2006 | Hintzer et al. |
| 2009/0312443 A1 | 12/2009 | Sawauchi et al. |

FOREIGN PATENT DOCUMENTS

| JP | 2003-522232 A | 7/2003 |
| JP | 2003-531232 A | 10/2003 |
| JP | 2008-506834 A | 3/2008 |
| WO | WO 2006019652 A1 * | 2/2006 ............ C08F 214/18 |
| WO | 2008/004660 A1 | 1/2008 |
| WO | 2010/066823 A1 | 6/2010 |

OTHER PUBLICATIONS

Communication dated Feb. 11, 2016 from the European Patent Office in counterpart application No. 13793904.7.
International Search Report of PCT/JP2013/064245 dated Jul. 9, 2013.
International Preliminary Report on Patentability dated Dec. 4, 2014, issued by the International Bureau in corresponding International Application No. PCT/JP2013/064245.
J. Burdon et al., "500. Fluorinated Sulphonic Acids. Part I. Perfluoro-methane-, -octane-, and -decane-sulphonic Acids and their Simple Derivatives.", Journal of the Chemical Society, 1957, pp. 2574-2578.

* cited by examiner

*Primary Examiner* — Nicole M Buie-Hatcher
(74) *Attorney, Agent, or Firm* — Sughrue Mion, PLLC

(57) ABSTRACT

A method for preparing a fluoropolymer aqueous dispersion, including: step (A) of preparing a fluoropolymer aqueous dispersion comprising a fluoropolymer having at least one selected from the group consisting of $-SO_2Y$ and $-COOR$ (wherein Y is a halogen, and R is a C1 to C4 alkyl) by emulsion polymerization; step (B) of heating the fluoropolymer aqueous dispersion to 50° C. or higher; and step (C) of contacting the fluoropolymer aqueous dispersion with an ion exchange resin for cation exchange after step (B), thereby providing a purified fluoropolymer aqueous dispersion, the fluoropolymer aqueous dispersion being adjusted to pH 7 or lower from the end of the polymerization in step (A) to the end of step (C).

9 Claims, No Drawings

METHOD FOR PRODUCING AQUEOUS FLUORINE-CONTAINING POLYMER DISPERSING ELEMENT, AND PURIFIED AQUEOUS FLUORINE-CONTAINING POLYMER DISPERSING ELEMENT

CROSS REFERENCE TO RELATED APPLICATIONS

This is a National Stage of International Application No. PCT/JP2013/064245 filed May 22, 2013, claiming priority based on Japanese Patent Application No. 2012-117663 filed May 23, 2012, the contents of all of which are incorporated herein by reference in their entirety.

TECHNICAL FIELD

The present invention relates to methods for preparing a fluoropolymer aqueous dispersion and purified fluoropolymer aqueous dispersions.

BACKGROUND ART

Sulfonic acid group and/or carboxyl group-containing fluoropolymers have been recently receiving attention because of their use in applications such as electrolyte membranes for fuel cells or chemical sensors. In particular, fluoropolymers having a sulfonic acid salt group, such as —SO₃Na, are used in ion exchange membranes for brine electrolysis.

The production of electrolyte membranes uses media for transferring a catalyst to the surface of electrolyte membranes. Conventional media mainly made of an organic solvent are desired to be replaced by aqueous dispersions of fluoropolymers for reasons of, for example, ease of handling. Since aqueous dispersions of fluoropolymers can be used on their own as coating compositions, they are suitable for film casting, impregnation and the like, and their applications are wide-ranging.

In the case where such aqueous dispersions are used for fuel cells or other electrochemical devices, impurities in the aqueous dispersions may have adverse effects on intended electrochemical reactions, for example. Therefore, there is a need for methods for removing such impurities.

One example is to perform an anion exchange treatment on a dispersion containing an ionic fluoropolymer having a group represented by —R¹SO₃⁻ and an anion species that is not covalently bound to the ionic fluoropolymer (see, for example, Patent Literature 1). In EXAMPLES of Patent Literature 1, a dispersion B of a hydrolyzable fluoropolymer having —SO₂F is cation-exchanged to remove Mn²⁺ ion, which can form MnO₂ during hydrolysis, and then hydrolyzed, and the resulting product is contacted with a cation exchange resin at a temperature of 40° C. to 50° C., and then purified with an anion exchange resin.

CITATION LIST

Patent Literature

Patent Literature 1: JP 2008-506834 T

SUMMARY OF INVENTION

Technical Problem

A fluoropolymer having a sulfonic acid salt group can be prepared by, for example, hydrolyzing a fluoropolymer having a hydrolyzable group, such as —SO₂F. In general, aqueous dispersions of fluoropolymers having a hydrolyzable group, such as —SO₂F, are prepared by emulsion polymerization of monomers including a fluoromonomer in an aqueous medium. This polymerization process often leaves iron ions derived from iron-containing materials of a polymerization tank, such as SUS, in the resulting as-polymerized fluoropolymer aqueous dispersions. The presence of remaining iron ions in an aqueous dispersion leads to low quality of the aqueous dispersion and film products formed of the aqueous dispersion, specifically to color development and low chemical stability, for example. Accordingly, it is preferable to sufficiently remove iron ions in aqueous dispersions.

One example of methods for removing iron ions is ion exchange using a cation exchange resin. Unfortunately, when this conventional method is used to treat an aqueous dispersion of a fluoropolymer having a hydrolyzable group, the fluoropolymer is likely to be adsorbed on the cation exchange resin because of its low dispersion stability. Thus, this method tends to result in low yield. In the case of a dispersion that is basified to improve the dispersion stability, iron oxide microparticles will form. Such microparticles are difficult to remove from the dispersion by ion exchange.

Thus, the conventional method should be improved to enable iron ions in fluoropolymer aqueous dispersions to be efficiently removed.

The present invention was made in view of the above-described background, and is aimed at providing methods for preparing a fluoropolymer aqueous dispersion which enable iron ions in fluoropolymer aqueous dispersions to be efficiently removed, and purified fluoropolymer aqueous dispersions.

Solution to Problem

The present inventors examined various ways for efficiently removing (divalent and trivalent) iron ions from a fluoropolymer aqueous dispersion containing a fluoropolymer having at least one selected from the group consisting of —SO₂Y and —COOR (wherein Y is a halogen, and R is a C1 to C4 alkyl), and found out that iron ions in a fluoropolymer aqueous dispersion can be removed without sacrificing yield by, after polymerization into the fluoropolymer, heating the fluoropolymer aqueous dispersion to 50° C. or higher while maintaining the dispersion at pH 7 or lower (in a range lower than the basic range), and subjecting the dispersion to cation exchange using a cation exchange resin. The heating to 50° C. or higher converts a portion of —SO₂Y of the fluoropolymer into —SO₃H (—COOR is converted to —COOH) to increase the dispersion stability. This conversion makes the fluoropolymer less likely to be adsorbed on the ion exchange resin. This explains why yield reductions can be avoided. Additionally, the pH of the aqueous dispersion is controlled to a low level to prevent formation of iron oxide microparticles. This facilitates removal of iron ions by ion exchange. As described above, the present inventors found out that iron ions in a fluoropolymer aqueous dispersion can be efficiently removed by cation exchange following a specific heating treatment, and completed the present invention.

Specifically, the present invention provides a method for preparing a fluoropolymer aqueous dispersion, including: step (A) of preparing a fluoropolymer aqueous dispersion containing a fluoropolymer having at least one selected from the group consisting of —SO₂Y and —COOR (wherein Y is a halogen, and R is a C1 to C4 alkyl) by emulsion polymerization; step (B) of heating the fluoropolymer aqueous dispersion to 50° C. or higher; and step (C) of contacting the fluoropolymer aqueous dispersion with an ion exchange resin for cation exchange after step (B), thereby providing a purified fluoropolymer aqueous dispersion, the fluoropolymer aqueous dispersion being adjusted to pH 7 or lower from the end of the polymerization in step (A) to the end of step (C).

The present invention also relates to purified fluoropolymer aqueous dispersions obtainable by the above-described method for preparing a fluoropolymer aqueous dispersion.

The following description is offered to illustrate the present invention in detail.

The method for preparing a fluoropolymer aqueous dispersion of the present invention includes step (A) of preparing a fluoropolymer aqueous dispersion containing a fluoropolymer having at least one selected from the group consisting of —$SO_2Y$ and —COOR (wherein Y is a halogen, and R is a C1 to C4 alkyl) by emulsion polymerization. Y in —$SO_2Y$ is preferably fluorine. R in —COOR is preferably methyl or ethyl.

The fluoropolymer preferably includes units derived from a fluoromonomer having at least one selected from the group consisting of —$SO_2Y$ and —COOR (wherein Y is a halogen, and R is a C1 to C4 alkyl), and more preferably includes units derived from a fluoromonomer having —$SO_2Y$ (wherein Y is a halogen).

The fluoropolymer is preferably a polymer having units derived from a fluoromonomer represented by the following formula (I):

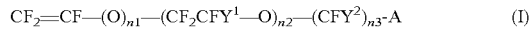

(wherein $Y^1$ is a halogen or perfluoroalkyl, n1 is an integer of 0 or 1, n2 is an integer of 0 to 3, n2 $Y^1$ groups may be the same or different, $Y^2$ is a halogen, n3 is an integer of 1 to 8, n3 $Y^2$ groups may be the same or different, and A is —$SO_2Y$ or —COOR (wherein Y is a halogen, and R is a C1 to C4 alkyl)) and is more preferably —$SO_2Y$ (wherein Y is a halogen).

$Y^1$ and $Y^2$ can be any halogen without limitation, and may be any of fluorine, chlorine, bromine, and iodine. In particular, fluorine is preferable. Examples of the perfluoroalkyl include, but not particularly limited to, trifluoromethyl and pentafluoroethyl. The integer n1 is preferably 1. The integer n2 is preferably 0 or 1. The integer n3 is preferably 2, 3 or 4, and more preferably 2.

Preferred is a fluoromonomer of the formula (I) wherein $Y^1$ is trifluoromethyl, $Y^2$ is fluorine, n1 is 1, n2 is 0 or 1, and n3 is 2.

The fluoropolymer is preferably a binary or multicomponent copolymer including units derived from a fluoromonomer represented by the formula (I) and units derived from another fluoroethylenic monomer. The fluoroethylenic monomer may be any vinyl group-containing monomer that is copolymerizable with fluoromonomers represented by the formula (I), and is different from fluoromonomers represented by the formula (I).

The fluoroethylenic monomer is preferably at least one monomer represented by the following formula (II):

(wherein $R_f^1$ is fluorine, chlorine, $R_f^2$ or $OR_f^2$, $R_f^2$ is a C1 to C9 linear or branched perfluoroalkyl optionally having an ether bond). More preferably, the at least one monomer represented by the formula (II) is or includes tetrafluoroethylene.

Other examples of the fluoroethylenic monomer include hydrogen-containing fluoroethylenic monomers represented by the following formula (III):

(wherein $Y^3$ is hydrogen or fluorine, $Y^4$ is hydrogen, fluorine, chlorine, $R_f^3$ or —$OR_f^3$, and $R_f^3$ is a linear or branched C1 to C9 fluoroalkyl optionally having an ether bond).

The fluoroethylenic monomer is preferably at least one selected from the group consisting of fluorovinylethers represented by $CF_2$=$CF_2$, $CH_2$=$CF_2$, $CF_2$=CFCl, $CF_2$=CFH, $CH_2$=CFH, $CF_2$=$CFCF_3$, and $CF_2$=CF—O—$R_f^4$ (wherein $R_f^4$ is a C1 to C9 fluoroalkyl or C1 to C9 fluoropolyether). Preferred are fluorovinylethers of the latter formula wherein $R_f^4$ is a C1 to C3 perfluoroalkyl.

The fluoroethylenic monomer is particularly preferably a perfluoroethylenic monomer, and more preferably $CF_2$=$CF_2$. Only one fluoroethylenic monomer or a combination of two or more fluoroethylenic monomers may be used.

Besides the fluoroethylenic monomer, other copolymerizable monomers may be used to impart various desired properties to the fluoropolymer as long as the intended fundamental properties of the fluoropolymer are not impaired. The other copolymerizable monomers are not limited at all, and can be appropriately selected from any copolymerizable monomers according to a desired purpose, such as control of the polymerization rate, control of the polymer composition, control of mechanical properties (e.g. elastic modulus), and introduction of a crosslinkable site. Examples thereof include monomers having two or more unsaturated bonds, such as perfluorodivinylether, and monomers having a cyano group, such as $CF_2$=$CFOCF_2CF_2CN$.

The fluoropolymer preferably contains 5 to 40 mol % of fluoromonomer units. In the case of a fluoropolymer containing less than 5 mol % of fluoromonomer units, the below-mentioned acid treatment step and optionally the below-mentioned alkali treatment step may only result in a low-performance fluoropolymer electrolyte. A fluoropolymer containing more than 40 mol % may provide a membrane with insufficient mechanical strength. In the case of fluoropolymer microparticles having more A groups of the formula (I) in the surface than in the inside thereof, the amount of fluoromonomer units present in the surface of the fluoropolymer microparticles is preferably in the above range.

The term "inside" of a particle refers to a center portion that constitutes 50% by mass of the total mass of the particle. The term "surface" of a particle refers to the remaining portion other than the inside of the particle.

The term "fluoromonomer units" herein refers to moieties in the molecule of the fluoropolymer that are derived from a fluoromonomer represented by the formula (I).

The phrase "amount of fluoromonomer units" refers to the percentage of the mole of the fluoromonomer for units derived from the fluoromonomer in the mole of starting monomers for all monomer units in the fluoropolymer molecule. The term "all monomer units" refers to all moieties derived from monomers in the molecule of the fluoropolymer. The phrase "starting monomers for all the monomer units" refers to the total amount of all starting monomers needed to make the fluoropolymer.

The amount of fluoromonomer units is determined by infrared absorption spectrometry [IR] or fused-state NMR at 300° C.

The fluoropolymer including units derived from a fluoromonomer is obtainable by emulsion polymerization. As used herein, the term "emulsion polymerization" in the method for preparing a fluoropolymer aqueous dispersion of the present invention refers to polymerization in an aqueous reaction medium using an emulsifier and/or emulsifying agent. The emulsifier may be any of common emulsifiers used in emulsion polymerization or any of emulsifiers different from such known emulsifiers. A known emulsifier and a novel emulsifier may be used in combination.

The emulsifier may be a compound having a C4-C12 fluoroalkyl optionally with oxygen and having a dissociating polar group. Examples thereof include ammonium perfluorooctanoate [$C_7F_{15}COONH_4$], perfluorohexanoic acid [$C_5F_{11}COONH_4$], and $CF_3OCF(CF_3)CF_2OCF(CF_3)COONH_4$. Typically, the emulsifier is used in an amount of 0.01 to 10% by mass of the aqueous reaction medium in the emulsion polymerization.

The emulsifying agent may be a fluoromonomer of the formula (I) wherein A is replaced by $-SO_3M_{1/L}$, $-SO_3NR^1_4$, $COONR^1_4$, or $-COOM_{1/L}$ (wherein M is hydrogen or a L-valent metal, the L-valent metal is a metal of Group 1, 2, 4, 8, 11, 12 or 13 of the periodic table, and $R^1$ groups are independently hydrogen or a C1 to C4 alkyl). In particular, fluoromonomers that are involved in the polymerization to give a polymeric emulsifier are preferred, such as $CF_2=CFOCF_2CF_2SO_3Na$, $CF_2=CFOCF_2CF(CF_3)OCF_2CF_2SO_3Na$, and $CF_2=CFOCF_2CF(CF_3)OCF_2CF_2CO_2Na$. In the emulsion polymerization, these fluoromonomers not only demonstrate emulsification properties, but also can be polymerized to be at least a part of the fluoropolymer molecule because these monomers are ethylenic compounds.

The use of the emulsifying agent allows the aqueous reaction medium to be emulsified without so-called emulsifiers. Thus, the emulsion polymerization can be accomplished without emulsifiers.

Depending on polymerization conditions, the emulsion polymerization may result in less number of fluoropolymer particles each having a larger size, and such particles may lead to non-uniform membranes. In some cases, the emulsion polymerization is preferably carried out in the presence of the emulsifier. In order to produce more number of particles, so-called "seed polymerization" may be carried out which involves diluting a dispersion obtained by polymerization using a large amount of emulsifier, and then further continuing the polymerization.

The term "aqueous reaction medium" used herein refers to a medium containing water to be used in the polymerization, and specifically to water or a medium containing an organic medium dissolved or dispersed in water. Preferably, the aqueous reaction medium is free from organic media, and an organic medium, if used, is preferably present in a very small amount.

The polymerization may be carried out in the presence of a polymerization initiator. The polymerization initiator is not limited at all, and may be an initiator commonly used for polymerization into fluoropolymers. Examples thereof include organic peroxides, inorganic peroxides, and azo compounds. In particular, ammonium persulfate [APS] is preferable. The amount of the polymerization initiator is preferably 0.01 to 1% by mass of the total amount of all the monomers used in the polymerization.

The aqueous reaction medium used in the polymerization preferably has a pH of 4 to 7. At a pH within the above range, the polymerization smoothly proceeds, while hydrolysis of $-SO_2Y$ and/or $-COOR$ (wherein Y and R are defined as above) of the fluoromonomer and/or the fluoropolymer can be suppressed to the lowest level during the polymerization.

The reaction conditions including the reaction temperature of the polymerization are not particularly limited, and the polymerization can be carried out in the same manner as common methods.

The fluoropolymer aqueous dispersion obtained by the polymerization is preferably subjected to below-mentioned step (B) directly after the polymerization without being subjected to dilution, enrichment, stabilization of the dispersion and any other post-treatment. In particular, it is preferable to subject the fluoropolymer aqueous dispersion to step (B) after the end of the polymerization without adding sodium hydroxide, potassium hydroxide, or any other basic compounds thereto.

The method for preparing a fluoropolymer aqueous dispersion of the present invention includes step (B) of heating the fluoropolymer aqueous dispersion to 50° C. or higher. Step (B) improves the dispersion stability of the fluoropolymer. This makes the fluoropolymer less likely to be adsorbed on an ion exchange resin in the below-mentioned cation exchange treatment, and therefore prevents yield reductions. Additionally, this step lowers the pH of the aqueous dispersion to prevent formation of iron oxide microparticles. This facilitates removal of iron ions by the cation exchange treatment.

Although the reason why step (B) improves the dispersion stability is unclear, the present inventors found that this phenomenon is strongly associated with $SO_3H$ or COOH of the fluoropolymer formed during step (B).

The $SO_3H$ or COOH of the fluoropolymer is presumed to result from hydrolysis of $SO_2F$ or COOR of the polymer during step (B).

The $SO_3H$ and COOH can be quantified by, for example, coagulating the fluoropolymer aqueous dispersion after step (B) with nitric acid or the like, washing the resulting product with water enough, forming the product into a film by heat pressing, and analyzing the film by infrared spectrometry.

The absorbance of $SO_3H$ appears near 1055 $cm^{-1}$ in an infrared spectrum, and is clearly distinct from the absorbance of $SO_2F$. Quantification based on absorption intensity can be accomplished by conventional techniques according to Lambert-Beer's law.

In order to improve the dispersion stability of the fluoropolymer aqueous dispersion and avoid yield reductions, it is preferable to control the $SO_3H$ or COOH content of the fluoropolymer in the dispersion to not less than 500 ppm, more preferably to not less than 1000 ppm, and still more preferably to not less than 2000 ppm. The $SO_3H$ or COOH content of the fluoropolymer is preferably not more than 20000 ppm, and more preferably not more than 10000 ppm for safety reasons because hydrolysis into these groups generates hydrogen fluoride.

In the case of a fluoropolymer having both $SO_3H$ and COOH, the total amount of $SO_3H$ and COOH is preferably in the above range.

The fluoropolymer aqueous dispersion is preferably heated to a temperature higher than 50° C., more preferably to 60° C. or higher, and still more preferably to 70° C. or higher in step (B). The fluoropolymer aqueous dispersion is preferably heated to not higher than 120° C., and more preferably to not higher than 100° C. in step (B).

The heating in step (B) is preferably continued for 1 hour or more, and more preferably for 2 hours or more. The heating in step (B) is continued preferably for not more than 24 hours, and more preferably for not more than 20 hours.

Preferably, the heating of the fluoropolymer aqueous dispersion to 50° C. or higher in step (B) is performed in such a manner as to lower the pH of the fluoropolymer aqueous dispersion to 2 or lower. At a pH of 2 or lower, formation of iron oxide microparticles is effectively prevented, which facilitates removal of iron ions in the dispersion by the below-mentioned cation exchange treatment.

The pH is preferably 0 or higher.

The pH can be measured with, for example, a pH meter.

The method for preparing a fluoropolymer aqueous dispersion of the present invention includes step (C) of contacting the fluoropolymer aqueous dispersion with an ion exchange resin for cation exchange (hereinafter, also referred to as cation exchange resin) after step (B), thereby providing a purified fluoropolymer aqueous dispersion. The cation exchange following the specific heating in step (B) allows for efficient removal of iron ions in the fluoropolymer aqueous dispersion. In order to sufficiently ensure effects of the present invention, the fluoropolymer aqueous dispersion heated in step (B) is preferably subjected to step (C) directly without being subjected to any post-treatment. In particular, it is preferable to subject the fluoropolymer aqueous dispersion to step (C) directly after the end of step (B) without adding sodium hydroxide, potassium hydroxide, or any other basic compounds to the dispersion.

The contacting of the fluoropolymer aqueous dispersion with the cation exchange resin can be accomplished in any manner without limitation. Specifically, the following methods can be used: passing the aqueous dispersion through a column filled with the cation exchange resin; and dispersing the cation exchange resin in the aqueous dispersion to exchange ions, and filtering the cation exchange resin off.

The degree of ion exchange can be regulated by the amount of the cation exchange resin used, the duration of the contact, and other factors, and its minimum endpoint is preferably determined so that the amount of iron ions in the aqueous dispersion after the treatment is reduced to a certain level or lower. In order not to produce colored films and to ensure chemical stability, the amount of iron ions in the aqueous dispersion is preferably not more than 1000 ppb, more preferably not more than 500 ppb, still more preferably not more than 300 ppb, further more preferably not more than 50 ppb, and particularly preferably not more than 10 ppb of the aqueous dispersion.

Thus, in one preferred embodiment of the present invention, the amount of iron ions in the purified fluoropolymer aqueous dispersion obtained in step (C) is not more than 1000 ppb.

The term "amount of iron ions" herein refers to the concentration of all iron components in the dispersion including not only free iron ions in the dispersion but also other iron ions such as those in iron oxide microparticles.

The amount of iron ions can be measured by atomic absorption spectrometry.

The cation exchange resin is not limited at all, provided that it is a resin capable of replacing cation impurities in the aqueous dispersion by hydrogen ion. Examples include cation exchange resins having an organic polymer molecular structure with an acidic functional group introduced thereto.

The acidity of the cation exchange resin used can be appropriately selected based on its polymer backbone and functional group, and typical examples include resins with a styrene backbone to which a sulfonic acid functional group is introduced, acrylic resin, methacrylic resin, and resins with a perfluoropolymer backbone to which sulfonic acid and/or carboxylic acid is/are introduced. Any resin can be used in the present invention to achieve the desired objects regardless of the acidity. The resin is thus not particularly limited, but is preferably a commercial resin because of ease of availability. Such a cation exchange resin can be typically prepared by conditioning a commercial Na-form resin with a mineral acid into the H form, or a commercial H-form resin may be used. Specifically, an appropriate one can be selected from, for example, Amberlite IR120B, Amberlite IR124, and Amberlite FPC3500 (all available from Rohm and Haas), and DIAION SK1B, DIAION SK110, DIAION SK112, DIAION WK10, DIAION WK11, DIAION WK100, and DIAION WK40 (all available from Mitsubishi Chemical Corporation).

In the method for preparing a fluoropolymer aqueous dispersion of the present invention, the fluoropolymer aqueous dispersion is adjusted to pH 7 or lower from the end of the polymerization in step (A) to the end of step (C). Namely, the fluoropolymer aqueous dispersion should be regulated not to become basic from the end of the polymerization in step (A) to the end of step (C). Once the fluoropolymer aqueous dispersion containing iron ions becomes basic, removal of iron ions becomes difficult even if the pH is lowered thereafter.

Preferably, the fluoropolymer aqueous dispersion is adjusted to pH 4 or lower from the end of the polymerization in step (A) to the end of step (C). The end of the polymerization in step (A) can be defined as, for example, the end of addition of the monomers, release of gaseous monomers, or addition of a polymerization terminator. In particular, it is preferably defined as release of gaseous monomers or addition of a polymerization terminator.

In order to maintain the fluoropolymer aqueous dispersion at pH 7 or lower from the end of the polymerization in step (A) to the end of step (C), the method for preparing a fluoropolymer aqueous dispersion of the present invention is preferably carried out without adding any basic compounds such as sodium hydroxide and potassium hydroxide to the fluoropolymer aqueous dispersion from the end of the polymerization in step (A) to the end of step (C).

The present invention also provides a purified fluoropolymer aqueous dispersion obtainable by the above-described method for preparing a fluoropolymer aqueous dispersion.

The purified fluoropolymer aqueous dispersion is a dispersion of microparticles of the fluoropolymer in an aqueous medium, and iron ions are present at a sufficiently reduced concentration therein.

The aqueous medium may be water or may consist of water and a water-soluble organic solvent. The aqueous medium may contain a surfactant, a stabilizer, or any other additives typically used in aqueous dispersions.

The water content of the aqueous dispersion is preferably 10 to 100% by mass. An aqueous dispersion with a water content of less than 10% by mass may have poor dispersion properties and may have adverse effects on ecosystem and human body. A more preferred lower limit is 40% by mass.

A purified fluoropolymer aqueous dispersion obtained by the preparation method of the present invention is preferably subjected to the step of hydrolyzing at least one selected from the group consisting of $-SO_2Y$ and $-COOR$. The hydrolysis converts the fluoropolymer having at least one selected from the group consisting of $-SO_2Y$ and $-COOR$ into a fluoropolymer having at least one selected from the group consisting of $-SO_3X$, $-SO_2NR^1_2$ and $-COOX$ (wherein X is $M_{1/L}$ or $NR^1_4$, M is hydrogen or a L-valent metal, the L-valent metal is a metal of Group 1, 2, 4, 8, 11, 12 or 13 of the periodic table, and $R^1$ groups are independently hydrogen or a C1 to C4 alkyl).

Preferably, an acid treatment is performed after the hydrolysis. The hydrolysis is typically performed in a basic environment to give a fluoropolymer in a salt form. Therefore, an acid treatment is preferably performed to convert the fluoropolymer into the H form. If the acid treatment is followed by an alkali treatment, the groups can be converted into the —$SO_3M^2_{1/L}$ or —$SO_3NR^3R^4R^5R^6$, and/or —$COOM^2_{1/L}$ or —$COONR^3R^4R^5R^6$ (wherein $M^2$ is a L-valent metal, the L-valent metal is a metal of Group 1, 2, 4, 8, 11, 12 or 13 of the periodic table, and $R^3$, $R^4$, $R^5$, and $R^6$, which may be the same or different, are each hydrogen or a C1 to C4 alkyl).

The amount of microparticles of the fluoropolymer in the purified fluoropolymer aqueous dispersion, as determined as a solids content on a mass basis, is preferably 2 to 80% by mass of the total mass of the purified fluoropolymer aqueous dispersion. Typically, the solids content on a mass basis of the purified fluoropolymer aqueous dispersion represents the amount of microparticles of the fluoropolymer in the purified fluoropolymer aqueous dispersion. Membrane formation using a fluoropolymer dispersion containing less than 2% by mass of microparticles of the fluoropolymer may result in low yield because of too much aqueous medium. A fluoropolymer dispersion containing 80% by mass of microparticles may be difficult to handle because of its too high viscosity. A more preferable lower limit is 5% by mass, and a more preferable upper limit is 60% by mass.

Microparticles of the fluoropolymer preferably include not less than 25% by mass of spherical microparticles of the fluoropolymer, which are substantially spherical. The phrase "include not less than 25% by mass of spherical microparticles of the fluoropolymer" means that 25% by mass or more of the fluoropolymer microparticles are made up by spherical microparticles of the fluoropolymer.

The aspect ratio can be a measure of the shape of microparticles of the fluoropolymer. The term "substantially spherical" herein corresponds to an aspect ratio of not more than 3. Typically, an aspect ratio closer to 1 indicates a more spherical shape. The aspect ratio of microparticles of the fluoropolymer is preferably not more than 3. A more preferable upper limit is 2, and a still more preferable upper limit is 1.5.

In general, polymer microparticles with an aeolotropic shape are likely to provide a viscous polymer dispersion, and disadvantageously, such a viscous dispersion of polymer microparticles can hardly contain a high concentration of polymer microparticles.

In the case where spherical fluoropolymer microparticles, which are substantially spherical, constitute not less than 25% by mass of the fluoropolymer microparticles, the purified fluoropolymer aqueous dispersion can have a low viscosity compared to the case with fluoropolymer microparticles that are not substantially spherical. This means that the solids content of the purified fluoropolymer aqueous dispersion can be increased, and allows for high-yield membrane formation by film casting or the like.

More preferably, not less than 50% by mass of the fluoropolymer microparticles are made up by spherical particles.

A purified fluoropolymer aqueous dispersion containing spherical fluoropolymer microparticles at a proportion within the above range can be prepared from a dispersion obtained by emulsion polymerization. A dispersion having a spherical fluoropolymer microparticle proportion of not less than 90% by mass can also be obtained from a dispersion obtained by emulsion polymerization. The purified fluoropolymer aqueous dispersion of the present invention can be prepared by mixing a dispersion containing a relatively large proportion of spherical fluoropolymer microparticles with fluoropolymer microparticles that are not substantially spherical to adjust the final proportion to a level that ensures desired functions.

Microparticles of the fluoropolymer, 50% by mass or more of which are made up by spherical microparticles, can be prepared by, for example, emulsion polymerization of a fluoromonomer having —$SO_2F$, and hydrolysis of the resulting polymer.

The fluoropolymer microparticles preferably have an average particle size of not less than 10 nm. Microparticles with an average particle size of less than 10 nm, when used as an electrode material, may cover active sites to inhibit good cell performance.

The upper limit of the average particle size can be set to, for example, 300 nm for reasons of the stability of the purified fluoropolymer aqueous dispersion and ease of preparation of the fluoropolymer, provided that the average particle size is within the above range. However, particles with an average particle size of more than 300 nm do not have significant negative effects on cell performance.

The fluoropolymer microparticles more preferably have an average particle size of 10 to 300 nm. A still more preferable lower limit of the average particle size is 30 nm, and a still more preferable upper limit is 160 nm.

The aspect ratio and average particle size can be determined as follows: applying the purified fluoropolymer aqueous dispersion to a glass plate; removing the aqueous dispersion medium; observing remaining aggregates consisting of fluoropolymer microparticles with a scanning or transmissive electron microscope, atomic force microscope, or the like; measuring the length of the long and short axes for 20 or more particles in an obtained image; and determining the ratio of the length of the long and short axes as the aspect ratio and the average of the length of the long and short axes as the below-mentioned average particle size.

Preferably, not less than 25% by mass of the fluoropolymer microparticles in the purified fluoropolymer aqueous dispersion are made up by spherical fluoropolymer microparticles with an average particle size of not less than 10 nm.

More preferably, not less than 25% by mass of the fluoropolymer microparticles in the purified fluoropolymer aqueous dispersion are made up by spherical fluoropolymer microparticles with an average particle size of 10 nm to 300 nm.

Still more preferably, not less than 25% by mass of the fluoropolymer microparticles in the purified fluoropolymer aqueous dispersion are made up by spherical fluoropolymer microparticles with an average particle size of 30 nm to 160 nm.

The purified fluoropolymer aqueous dispersion of the present invention, which is prepared by the above-described preparation method, contains iron ions at a sufficiently reduced level. The amount of iron ions in the purified fluoropolymer aqueous dispersion is preferably not more than 1000 ppb, more preferably not more than 500 ppb, still more preferably not more than 300 ppb, further preferably not more than 50 ppb, and particularly preferably not more than 10 ppb of the aqueous dispersion.

The purified fluoropolymer aqueous dispersions of the present invention may contain additives, if necessary, besides the fluoropolymer microparticles. Examples of such additives include, but not particularly limited to, fluororesins such as polytetrafluoroethylene [PTFE], tetrafluoroethylene/hexafluoropropylene [FEP] copolymers, and tetrafluoroethylene/perfluoro(alkyl vinyl ether) [PFA] copolymers; thermoplastic resins such as polyethylene, polypropylene, and polyethyleneterephtalate [PET]; thermosetting resins such as polyamide and polyimide; microparticles of other ion exchange resins; and microparticles of inorganic materials such as alumina, silica, zirconia, and carbon.

The purified fluoropolymer aqueous dispersion of the present invention may be optionally mixed with a liquid medium other than the aqueous dispersion medium into a dispersion composition for membrane formation. Such a composition can be impregnated into a porous support or used for film casting, and thus can be suitably used for membrane formation. The purified fluoropolymer aqueous dispersion of the present invention may be optionally combined with polyethylene glycol or the like for the purpose of forming thick membranes.

The liquid medium is a liquid that makes the fluoropolymer microparticles wet. The liquid medium is preferably in the liquid state at room temperature.

In the case where good dispersibility of the fluoropolymer microparticles is desired, the following liquid media can be used, for example: alcohols; nitrogen-containing solvents such as N-methylpyrrolidone [NMP]; ketones such as acetone; esters such as ethyl acetate; polar ethers such as diglyme and tetrahydrofuran [THF]; carbonate esters such as diethylenecarbonate; and polar organic solvents such as sulfones (e.g. dimethyl sulfoxide [DMSO]). Any one of these or a mixture of two or more of these may be used. The term "liquid medium" is intended to encompass water-soluble organic solvents listed for the aqueous dispersion medium.

The dispersion composition for membrane formation may contain additional components other than the purified fluoropolymer aqueous dispersion and the liquid medium in amounts that do not impair ease of membrane formation and other properties of the dispersion composition for membrane formation. Examples of the additional components include membrane formation aids and active substances.

The purified fluoropolymer aqueous dispersion and the dispersion composition for membrane formation are suitably used for membrane formation. Membrane formation may be accomplished in any manner without limitation, and examples include film casting and impregnation of a porous supporter. The "film casting" typically refers to membrane formation involving applying the purified fluoropolymer aqueous dispersion or the dispersion composition for membrane formation to the surface of a glass substrate or the like; drying the substrate at ambient temperature and/or by heating; and separating a thin membrane from the surface of the substrate optionally by immersion into water. The membrane formation by "impregnation of a porous supporter" means membrane formation involving impregnating a porous supporter with the purified fluoropolymer aqueous dispersion or the dispersion composition for membrane formation, and removing the liquid medium. The liquid medium can be typically removed by drying at ambient temperature and/or drying by heating.

Membranes formed as described above can be suitably used, in particular, as immobilized active substance materials or membrane electrode assemblies of solid polymer electrolyte fuel cells.

Advantageous Effects of Invention

The above-described features of the method for preparing a fluoropolymer aqueous dispersion of the present invention allow for efficient removal of iron ions from fluoropolymer aqueous dispersions. The preparation method of the present invention provides purified fluoropolymer aqueous dispersions that can be suitably used for dispersion compositions for membrane formation, membranes, immobilized active substance materials, membrane electrode assemblies and solid polymer electrolyte fuel cells.

DESCRIPTION OF EMBODIMENTS

The following describes the present invention in more detail based on examples, but these examples are not to be construed to limit the present invention.

Cation-exchange resin beads used in the following examples and comparative examples were resin beads of the acid form obtained by treating Amberlite IR120B (Rohm and Haas) with hydrochloric acid.

The device used to measure the amount of iron ions by atomic absorption spectrometry in the following examples and comparative examples was 28000 (Hitachi, Ltd.). The lower limit of detection was 1 ppb.

Example 1

(1) Synthesis of Fluoropolymer Aqueous Dispersion (1-1) A 6000-ml stainless steel stirring autoclave was charged with 150 g of a 20% by mass aqueous solution of $CF_3(CF_2)_6CO_2NH_4$ and 2850 g of pure water, followed by sufficient evacuation and nitrogen substitution. After sufficiently evacuating the autoclave, tetrafluoroethylene [TFE] gas was fed to the autoclave until a gauge pressure of 0.2 MPa was attained, and the temperature was raised to 50° C. Subsequently, 180 g of $CF_2=CFOCF_2CF_2SO_2F$ was injected, and the gauge pressure was raised to 0.7 MPa by introduction of TFE gas. Then, an aqueous solution of 1.5 g of ammonium persulfate [APS] in 30 g of pure water was injected to initiate polymerization.

For supplementing the TFE consumed by the polymerization, TFE was continuously fed to the autoclave so that the pressure inside the autoclave might be maintained at 0.7 MPa. The polymerization was continued while continuously feeding $CF_2=CFOCF_2CF_2SO_2F$ in an amount of 65% by mass relative to the additional TFE.

Once the amount of TFE supplied had reached 780 g, the polymerization was stopped by releasing the pressure in the autoclave. The autoclave was then cooled to room temperature to afford 4450 g of a slightly white fluoropolymer aqueous dispersion containing approximately 28% by mass of a fluoropolymer having $SO_2F$. The obtained fluoropolymer aqueous dispersion was found to have a pH of 3. The fluoropolymer aqueous dispersion was measured for cation contents therein by atomic absorption spectrometry, and found to contain iron ions in an amount of 3 ppm of the dispersion.

(1-2) A 10-g portion of the fluoropolymer aqueous dispersion, when combined with 5 g of a 10% by mass potassium hydroxide aqueous solution, turned brownish white.

(2) Stabilization of Fluoropolymer Aqueous Dispersion by Heating (2-1) Into each of 10 polyethylene containers having a volume of 1000 ml, a 450 ml portion of the fluoropolymer aqueous dispersion obtained in (1-1) was charged, and the containers were heated at 80° C. with a temperature-controlled tank for 20 hours, followed by cooling to room temperature. The pH of the fluoropolymer aqueous dispersion measured after the heating was 2.

(2-2) A 100-g portion of the fluoropolymer aqueous dispersion having been subjected to heating was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(2-3) The fluoropolymer obtained in (2-2) was molten by heating at 270° C. to form a film. The resulting film was measured for IR spectrum, and the results show that the polymer has $SO_3H$ in an amount of 2000 ppm of the mass of the polymer.

(3) Ion Exchange Treatment (3-1) A glass column (diameter: 10 cm, height: 50 cm) filled with pure water and cation-exchange resin beads was prepared, and 4450 g of the fluoropolymer aqueous dispersion obtained in (2-1) was passed therethrough. The passing rate of the fluoropolymer aqueous dispersion was 120 g/minute. The passing yielded 5000 g of a fluoropolymer aqueous dispersion containing approximately 25% by mass of a fluoropolymer. The obtained fluoropolymer aqueous dispersion was found to have a pH of 1.

(3-2) The fluoropolymer aqueous dispersion having been passed through the glass column was measured for cation contents therein by atomic absorption spectrometry, and found to contain iron ions in an amount of 4 ppb of the fluoropolymer aqueous dispersion.

(3-3) A 10-g portion of the fluoropolymer aqueous dispersion having been passed through the glass column, when combined with 5 g of a 10% by mass potassium hydroxide aqueous solution, turned white, and no visible brown component was observed.

(3-4) A 100-g portion of the fluoropolymer aqueous dispersion having been passed through the glass column was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 20 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the $SO_2F$.

(3-6) In a bottle made of a tetrafluoroethylene/perfluoro (alkyl vinyl ether) copolymer, 1 mg of $FeSO_4 \cdot 7H_2O$ was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 15 ppm.

Example 2

(1) Synthesis of Fluoropolymer Aqueous Dispersion (1-1) A 6000-ml stainless steel stirring autoclave was charged with 100 g of a 20% by mass aqueous solution of $CF_3(CF_2)_4CO_2NH_4$, 10 g of $CF_2$=$CFOCF_2CF_2SO_2Na$ and 2850 g of pure water, followed by sufficient evacuation and nitrogen substitution. After sufficiently evacuating the autoclave, tetrafluoroethylene [TFE] gas was fed to the autoclave until a gauge pressure of 0.2 MPa was attained, and the temperature was raised to 50° C. Subsequently, 180 g of $CF_2$=$CFOCF_2CF_2SO_2F$ was injected, and the gauge pressure was raised to 0.7 MPa by introduction of TFE gas. Then, an aqueous solution of 1.5 g of ammonium persulfate [APS] in 30 g of pure water was injected to initiate polymerization.

For supplementing the TFE consumed by the polymerization, TFE was continuously fed to the autoclave so that the pressure inside the autoclave might be maintained at 0.7 MPa. The polymerization was continued while continuously feeding $CF_2$=$CFOCF_2CF_2SO_2F$ in an amount of 65% by mass relative to the additional TFE.

Once the amount of TFE supplied had reached 780 g, the polymerization was stopped by releasing the pressure in the autoclave. The autoclave was then cooled to room temperature to afford 4450 g of a slightly white fluoropolymer aqueous dispersion containing approximately 28% by mass of a fluoropolymer having $SO_2F$. The obtained fluoropolymer aqueous dispersion was found to have a pH of 3. The fluoropolymer aqueous dispersion was measured for cation contents therein by atomic absorption spectrometry, and found to contain iron ions in an amount of 3 ppm of the dispersion.

(2) Stabilization of Fluoropolymer Aqueous Dispersion by Heating (2-1) Into each of 10 polyethylene containers having a volume of 1000 ml, a 450 ml portion of the fluoropolymer aqueous dispersion obtained in (1-1) was charged, and the containers were heated at 80° C. with a temperature-controlled tank for 20 hours, followed by cooling to room temperature. The pH of the fluoropolymer aqueous dispersion measured after the heating was 2.

(2-2) A 100-g portion of the fluoropolymer aqueous dispersion having been subjected to heating was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(2-3) The fluoropolymer obtained in (2-2) was molten by heating at 270° C. to form a film. The resulting film was measured for IR spectrum, and the results show that the polymer has $SO_3H$ in an amount of 2000 ppm of the mass of the polymer.

(3) Ion Exchange Treatment (3-1) A glass column (diameter: 3 cm, height: 40 cm) filled with pure water and cation-exchange resin beads was prepared, and 4450 g of the fluoropolymer aqueous dispersion obtained in (2-1) was passed therethrough. The passing rate of the fluoropolymer aqueous dispersion was 6 g/minute. The passing yielded 5000 g of a fluoropolymer aqueous dispersion containing approximately 25% by mass of a fluoropolymer. The obtained fluoropolymer aqueous dispersion was found to have a pH of 1.

(3-2) The fluoropolymer aqueous dispersion having been passed through the glass column was measured for cation contents therein by atomic absorption spectrometry, and found to contain iron ions in an amount of 20 ppb of the fluoropolymer aqueous dispersion.

(3-3) A 10-g portion of the fluoropolymer aqueous dispersion having been passed through the glass column, when combined with 5 g of a 10% by mass potassium hydroxide aqueous solution, turned white, and no visible brown component was observed.

(3-4) A 100-g portion of the fluoropolymer aqueous dispersion having been passed through the glass column was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 20 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the $SO_2F$.

(3-6) In a bottle made of a tetrafluoroethylene/perfluoro (alkyl vinyl ether) copolymer, 1 mg of $FeSO_4.7H_2O$ was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 20 ppm.

Example 3

(1) Synthesis of Fluoropolymer Aqueous Dispersion (1-1) A fluoropolymer aqueous dispersion was prepared by the same procedure as in (1-1) of Example 1. The dispersion was a slightly white fluoropolymer aqueous dispersion weighing 4500 g and containing approximately 28% by mass of a fluoropolymer having $SO_2F$. The pH of the fluoropolymer aqueous dispersion was 3. The fluoropolymer aqueous dispersion was measured for cation contents therein by atomic absorption spectrometry, and found to contain iron ions in an amount of 3 ppm of the dispersion.

(2) Stabilization of Fluoropolymer Aqueous Dispersion by Heating (2-1) Into each of 10 polyethylene containers having a volume of 1000 ml, a 450 ml portion of the fluoropolymer aqueous dispersion obtained in (1-1) was charged, and the containers were heated at 80° C. with a temperature-controlled tank for 20 hours, followed by cooling to room temperature. The pH of the fluoropolymer aqueous dispersion measured after the heating was 2.

(2-2) A 100-g portion of the fluoropolymer aqueous dispersion having been subjected to heating was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(2-3) The fluoropolymer obtained in (2-2) was molten by heating at 270° C. to form a film. The resulting film was measured for IR spectrum, and the results show that the polymer has $SO_3H$ in an amount of 2000 ppm of the mass of the polymer.

(3) Ion Exchange Treatment (3-1) A glass column (diameter: 3 cm, height: 30 cm) filled with pure water and cation-exchange resin beads was prepared, and 4450 g of the fluoropolymer aqueous dispersion obtained in (2-1) was passed therethrough. The passing rate of the fluoropolymer aqueous dispersion was 4 g/minute. The passing yielded 5000 g of a fluoropolymer aqueous dispersion containing approximately 25% by mass of a fluoropolymer. The obtained fluoropolymer aqueous dispersion was found to have a pH of 1.

(3-2) The fluoropolymer aqueous dispersion having been passed through the glass column was measured for cation contents therein by atomic absorption spectrometry, and found to contain iron ions in an amount of 200 ppb of the fluoropolymer aqueous dispersion.

(3-3) A 10-g portion of the fluoropolymer aqueous dispersion having been passed through the glass column, when combined with 5 g of a 10% by mass potassium hydroxide aqueous solution, turned white, and no visible brown component was observed.

(3-4) A 100-g portion of the fluoropolymer aqueous dispersion having been passed through the glass column was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 20 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the $SO_2F$.

(3-6) In a bottle made of a tetrafluoroethylene/perfluoro (alkyl vinyl ether) copolymer, 1 mg of $FeSO_4.7H_2O$ was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 20 ppm.

Example 4

(1) Synthesis of Fluoropolymer Aqueous Dispersion (1-1) A fluoropolymer aqueous dispersion was prepared by the same procedure as in (1-1) of Example 1. The dispersion was a slightly white fluoropolymer aqueous dispersion weighing 4500 g and containing approximately 28% by mass of a fluoropolymer having $SO_2F$. The pH of the fluoropolymer aqueous dispersion was 3. The fluoropolymer aqueous dispersion was measured for cation contents therein by atomic absorption spectrometry, and found to contain iron ions in an amount of 3 ppm of the dispersion.

(2) Stabilization of Fluoropolymer Aqueous Dispersion by Heating (2-1) Into each of 10 polyethylene containers having a volume of 1000 ml, a 450 ml portion of the fluoropolymer aqueous dispersion obtained in (1-1) was charged, and the containers were heated at 80° C. with a temperature-controlled tank for 20 hours, followed by cooling to room temperature. The pH of the fluoropolymer aqueous dispersion measured after the heating was 2.

(2-2) A 100-g portion of the fluoropolymer aqueous dispersion having been subjected to heating was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(2-3) The fluoropolymer obtained in (2-2) was molten by heating at 270° C. to form a film. The resulting film was measured for IR spectrum, and the results show that the polymer has $SO_3H$ in an amount of 2000 ppm of the mass of the polymer.

(3) Ion Exchange Treatment (3-1) A glass column (diameter: 3 cm, height: 20 cm) filled with pure water and cation-exchange resin beads was prepared, and 4450 g of the fluoropolymer aqueous dispersion obtained in (2-1) was passed therethrough. The passing rate of the fluoropolymer aqueous dispersion was 4 g/minute. The passing yielded 5000 g of a fluoropolymer aqueous dispersion containing approximately 25% by mass of a fluoropolymer. The obtained fluoropolymer aqueous dispersion was found to have a pH of 1.

(3-2) The fluoropolymer aqueous dispersion having been passed through the glass column was measured for cation contents therein by atomic absorption spectrometry, and found to contain iron ions in an amount of 450 ppb of the fluoropolymer aqueous dispersion.

(3-3) A 10-g portion of the fluoropolymer aqueous dispersion having been passed through the glass column, when combined with 5 g of a 10% by mass potassium hydroxide aqueous solution, turned white, and no visible brown component was observed.

(3-4) A 100-g portion of the fluoropolymer aqueous dispersion having been passed through the glass column was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 20 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the $SO_2F$.

(3-6) In a bottle made of a tetrafluoroethylene/perfluoro (alkyl vinyl ether) copolymer, 1 mg of $FeSO_4.7H_2O$ was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 20 ppm.

Example 5

(1) Synthesis of Fluoropolymer Aqueous Dispersion (1-1) A fluoropolymer aqueous dispersion was prepared by the same procedure as in (1-1) of Example 1. The dispersion was a slightly white fluoropolymer aqueous dispersion weighing 4500 g and containing approximately 28% by mass of a fluoropolymer having $SO_2F$. The pH of the fluoropolymer aqueous dispersion was 3. The fluoropolymer aqueous dispersion was measured for cation contents therein by atomic absorption spectrometry, and found to contain iron ions in an amount of 3 ppm of the dispersion.

(2) Stabilization of Fluoropolymer Aqueous Dispersion by Heating (2-1) Into each of 10 polyethylene containers having a volume of 1000 ml, a 450 ml portion of the fluoropolymer aqueous dispersion obtained in (1-1) was charged, and the containers were heated at 80° C. with a temperature-controlled tank for 20 hours, followed by cooling to room temperature. The pH of the fluoropolymer aqueous dispersion measured after the heating was 2.

(2-2) A 100-g portion of the fluoropolymer aqueous dispersion having been subjected to heating was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(2-3) The fluoropolymer obtained in (2-2) was molten by heating at 270° C. to form a film. The resulting film was measured for IR spectrum, and the results show that the polymer has $SO_3H$ in an amount of 2000 ppm of the mass of the polymer.

(3) Ion Exchange Treatment (3-1) A glass column (diameter: 3 cm, height: 15 cm) filled with pure water and cation-exchange resin beads was prepared, and 4450 g of the fluoropolymer aqueous dispersion obtained in (2-1) was passed therethrough. The passing rate of the fluoropolymer aqueous dispersion was 4 g/minute. The passing yielded 5000 g of a fluoropolymer aqueous dispersion containing approximately 25% by mass of a fluoropolymer. The obtained fluoropolymer aqueous dispersion was found to have a pH of 1.

(3-2) The fluoropolymer aqueous dispersion having been passed through the glass column was measured for cation contents therein by atomic absorption spectrometry, and found to contain iron ions in an amount of 900 ppb of the fluoropolymer aqueous dispersion.

(3-3) A 10-g portion of the fluoropolymer aqueous dispersion having been passed through the glass column, when combined with 5 g of a 10% by mass potassium hydroxide aqueous solution, turned white, and no visible brown component was observed.

(3-4) A 100-g portion of the fluoropolymer aqueous dispersion having been passed through the glass column was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 20 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the $SO_2F$.

(3-6) In a bottle made of a tetrafluoroethylene/perfluoro (alkyl vinyl ether) copolymer, 1 mg of $FeSO_4.7H_2O$ was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 25 ppm.

Example 6

(1) Synthesis of Fluoropolymer Aqueous Dispersion (1-1) A fluoropolymer aqueous dispersion was prepared by the same procedure as in (1-1) of Example 1. The dispersion was a slightly white fluoropolymer aqueous dispersion weighing 4500 g and containing approximately 28% by mass of a fluoropolymer having $SO_2F$. The pH of the fluoropolymer aqueous dispersion was 3. The fluoropolymer aqueous dispersion was measured for cation contents therein by atomic absorption spectrometry, and found to contain iron ions in an amount of 3 ppm of the dispersion.

(2) Stabilization of Fluoropolymer Aqueous Dispersion by Heating (2-1) Into each of 10 polyethylene containers having a volume of 1000 ml, a 450 ml portion of the fluoropolymer aqueous dispersion obtained in (1-1) was charged, and the containers were heated at 80° C. with a temperature-controlled tank for 5 hours, followed by cooling to room temperature. The pH of the fluoropolymer aqueous dispersion measured after the heating was 2.

(2-2) A 100-g portion of the fluoropolymer aqueous dispersion having been subjected to heating was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(2-3) The fluoropolymer obtained in (2-2) was molten by heating at 270° C. to form a film. The resulting film was measured for IR spectrum, and the results show that the polymer has $SO_3H$ in an amount of 550 ppm of the mass of the polymer.

(3) Ion Exchange Treatment (3-1) A glass column (diameter: 3 cm, height: 15 cm) filled with pure water and cation-exchange resin beads was prepared, and 4450 g of the fluoropolymer aqueous dispersion obtained in (2-1) was passed therethrough. The passing rate of the fluoropolymer aqueous dispersion was 4 g/minute. The passing yielded 5000 g of a fluoropolymer aqueous dispersion containing approximately 25% by mass of a fluoropolymer. The obtained fluoropolymer aqueous dispersion was found to have a pH of 1.

(3-2) The fluoropolymer aqueous dispersion having been passed through the glass column was measured for cation contents therein by atomic absorption spectrometry, and found to contain iron ions in an amount of 900 ppb of the fluoropolymer aqueous dispersion.

(3-3) A 10-g portion of the fluoropolymer aqueous dispersion having been passed through the glass column, when combined with 5 g of a 10% by mass potassium hydroxide aqueous solution, turned white, and no visible brown component was observed.

(3-4) A 100-g portion of the fluoropolymer aqueous dispersion having been passed through the glass column was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 20 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the $SO_2F$.

(3-6) In a bottle made of a tetrafluoroethylene/perfluoro (alkyl vinyl ether) copolymer, 1 mg of $FeSO_4.7H_2O$ was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 25 ppm.

Example 7

(1) Synthesis of Fluoropolymer Aqueous Dispersion (1-1) A 500-ml stainless steel stirring autoclave was charged with 100 g of a 20% by mass aqueous solution of $CF_3(CF_2)_6CO_2NH_4$ and 225 g of pure water, followed by sufficient evacuation and nitrogen substitution. After sufficiently evacuating the autoclave, tetrafluoroethylene [TFE] gas was fed to the autoclave until a gauge pressure of 0.05 MPa was attained, and the temperature was raised to 60° C. Subsequently, 5 g of $CF_2=CFOCF_2CF(CF_3)OCF_2CF_2SO_2F$ was injected, and the gauge pressure was raised to 0.15 MPa by introduction of TFE gas. Then, an aqueous solution of 0.5 g of ammonium persulfate [APS] in 5 g of pure water was injected to initiate polymerization.

For supplementing the TFE consumed by the polymerization, TFE was continuously fed to the autoclave so that the pressure inside the autoclave might be maintained at 0.15 MPa. The polymerization was continued while continuously feeding $CF_2=CFOCF_2CF(CF_3)OCF_2CF_2SO_2F$ in an amount of 167% by mass relative to the additional TFE.

Once the amount of TFE supplied had reached 15 g, the polymerization was stopped by releasing the pressure in the autoclave. The autoclave was then cooled to room temperature to afford 295 g of a slightly white fluoropolymer aqueous dispersion containing approximately 14% by mass of a fluoropolymer having $SO_2F$. The obtained fluoropolymer aqueous dispersion was found to have a pH of 3. The fluoropolymer aqueous dispersion was measured for cation contents therein by atomic absorption spectrometry, and found to contain iron ions in an amount of 3 ppm of the dispersion.

(2) Stabilization of Fluoropolymer Aqueous Dispersion by Heating (2-1) Into polyethylene containers having a volume of 100 ml, a 250 ml portion of the fluoropolymer aqueous dispersion obtained in (1-1) was charged, and the containers were heated at 80° C. with a temperature-controlled tank for 5 hours, followed by cooling to room temperature. The pH of the fluoropolymer aqueous dispersion measured after the heating was 2.

(2-2) A 50-g portion of the fluoropolymer aqueous dispersion having been subjected to heating was combined with 3 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 7 g.

(2-3) The fluoropolymer obtained in (2-2) was molten by heating at 270° C. to form a film. The resulting film was measured for IR spectrum, and the results show that the polymer has $SO_3H$ in an amount of 510 ppm of the mass of the polymer.

(3) Ion Exchange Treatment (3-1) A glass column (diameter: 3 cm, height: 15 cm) filled with pure water and cation-exchange resin beads was prepared, and 200 g of the fluoropolymer aqueous dispersion obtained in (2-1) was passed therethrough. The passing rate of the fluoropolymer aqueous dispersion was 4 g/minute. The passing yielded 220 g of a fluoropolymer aqueous dispersion containing approximately 13% by mass of a fluoropolymer. The obtained fluoropolymer aqueous dispersion was found to have a pH of 1.

(3-2) The fluoropolymer aqueous dispersion having been passed through the glass column was measured for cation contents therein by atomic absorption spectrometry, and found to contain iron ions in an amount of 850 ppb of the fluoropolymer aqueous dispersion.

(3-3) A 10-g portion of the fluoropolymer aqueous dispersion having been passed through the glass column, when combined with 5 g of a 10% by mass potassium hydroxide aqueous solution, turned white, and no visible brown component was observed.

(3-4) A 50-g portion of the fluoropolymer aqueous dispersion having been passed through the glass column was combined with 3 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 6 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the $SO_2F$.

(3-6) In a bottle made of a tetrafluoroethylene/perfluoro (alkyl vinyl ether) copolymer, 1 mg of $FeSO_4.7H_2O$ was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 23 ppm.

Example 8

(1) Synthesis of Fluoropolymer Aqueous Dispersion (1-1) A fluoropolymer aqueous dispersion was prepared by the same procedure as in (1-1) of Example 1. The dispersion was a slightly white fluoropolymer aqueous dispersion weighing 4500 g and containing approximately 28% by mass of a fluoropolymer having $SO_2F$. The pH of the fluoropolymer aqueous dispersion was 3. The fluoropolymer aqueous dispersion was measured for cation contents therein by atomic absorption spectrometry, and found to contain iron ions in an amount of 3 ppm of the dispersion.

(2) Stabilization of Fluoropolymer Aqueous Dispersion by Heating (2-1) Into each of 10 polyethylene containers having a volume of 1000 ml, a 450 ml portion of the fluoropolymer aqueous dispersion obtained in (1-1) was charged, and the containers were heated at 55° C. with a temperature-controlled tank for 14 hours, followed by cooling to room temperature. The pH of the fluoropolymer aqueous dispersion measured after the heating was 2.

(2-2) A 100-g portion of the fluoropolymer aqueous dispersion having been subjected to heating was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(2-3) The fluoropolymer obtained in (2-2) was molten by heating at 270° C. to form a film. The resulting film was measured for IR spectrum, and the results show that the polymer has SO$_3$H in an amount of 500 ppm of the mass of the polymer.

(3) Ion Exchange Treatment (3-1) A glass column (diameter: 3 cm, height: 15 cm) filled with pure water and cation-exchange resin beads was prepared, and 4450 g of the fluoropolymer aqueous dispersion obtained in (2-1) was passed therethrough. The passing rate of the fluoropolymer aqueous dispersion was 4 g/minute. The passing yielded 5000 g of a fluoropolymer aqueous dispersion containing approximately 25% by mass of a fluoropolymer. The obtained fluoropolymer aqueous dispersion was found to have a pH of 1.

(3-2) The fluoropolymer aqueous dispersion having been passed through the glass column was measured for cation contents therein by atomic absorption spectrometry, and found to contain iron ions in an amount of 800 ppb of the fluoropolymer aqueous dispersion.

(3-3) A 10-g portion of the fluoropolymer aqueous dispersion having been passed through the glass column, when combined with 5 g of a 10% by mass potassium hydroxide aqueous solution, turned white, and no visible brown component was observed.

(3-4) A 100-g portion of the fluoropolymer aqueous dispersion having been passed through the glass column was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 20 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the SO$_2$F.

(3-6) In a bottle made of a tetrafluoroethylene/perfluoro (alkyl vinyl ether) copolymer, 1 mg of FeSO$_4$.7H$_2$O was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 22 ppm.

Comparative Example 1

Without Dispersion Stabilization Treatment by Heating (1) Synthesis of Fluoropolymer Aqueous Dispersion (1-1) A fluoropolymer aqueous dispersion was prepared by the same procedure as in (1-1) of Example 1. The dispersion was a slightly white fluoropolymer aqueous dispersion weighing 4500 g and containing approximately 28% by mass of a fluoropolymer having SO$_2$F. The pH of the fluoropolymer aqueous dispersion was 3. The fluoropolymer aqueous dispersion was measured for cation contents therein by atomic absorption spectrometry, and found to contain iron ions in an amount of 3 ppm of the dispersion.

(1-2) A 100-g portion of the fluoropolymer aqueous dispersion was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(1-3) The fluoropolymer obtained in (1-2) was molten by heating at 270° C. to form a film. The resulting film was measured for IR spectrum, and the results show that the polymer has SO$_3$H in an amount of 100 ppm of the mass of the polymer.

(2) Ion Exchange Treatment (2-1) A glass column (diameter: 10 cm, height: 50 cm) filled with pure water and cation-exchange resin beads was prepared, and 4400 g of the fluoropolymer aqueous dispersion obtained in (1-1) was passed therethrough. The passing rate of the fluoropolymer aqueous dispersion was 120 g/minute.

(2-2) The fluoropolymer aqueous dispersion having been passed through the glass column was found to contain a fluoropolymer in an amount of approximately 12% by mass and to have a total weight of 4900 g. This indicates that the passing through the glass column decreased the amount of the fluoropolymer in the fluoropolymer aqueous dispersion.

(2-3) The fluoropolymer aqueous dispersion having been passed through the glass column was measured for cation contents therein by atomic absorption spectrometry, and found to contain iron ions in an amount of 5 ppb of the fluoropolymer aqueous dispersion.

(2-4) A 10-g portion of the fluoropolymer aqueous dispersion having been passed through the glass column, when combined with 5 g of a 10% by mass potassium hydroxide aqueous solution, turned white, and no visible brown component was observed.

Comparative Example 2

Stabilization with Alkali (1) Synthesis of Fluoropolymer Aqueous Dispersion (1-1) A fluoropolymer aqueous dispersion was prepared by the same procedure as in (1-1) of Example 1. The dispersion was a slightly white fluoropolymer aqueous dispersion weighing 4500 g and containing approximately 28% by mass of a fluoropolymer having SO$_2$F. The resulting fluoropolymer aqueous dispersion was found to have a pH of 3. The fluoropolymer aqueous dispersion was measured for cation contents therein by atomic absorption spectrometry, and found to contain iron ions in an amount of 3 ppm of the dispersion.

(2) Stabilization of Fluoropolymer Aqueous Dispersion with Addition of Alkali (2-1) When combined with 50 g of a 10% by mass potassium hydroxide aqueous solution, 4500 g of the fluoropolymer aqueous dispersion obtained in (1-1) turned brownish white. The pH of the fluoropolymer aqueous dispersion was 14.

(2-2) Into each of 10 polyethylene containers having a volume of 1000 ml, a 450 ml portion of the fluoropolymer aqueous dispersion obtained in (2-1) was charged, and the containers were heated at 80° C. with a temperature-controlled tank for 20 hours, followed by cooling to room temperature. The pH of the fluoropolymer aqueous dispersion measured after the heating was 2. The fluoropolymer aqueous dispersion was slightly brownish white.

(2-3) A 100-g portion of the fluoropolymer aqueous dispersion obtained in (2-2) was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 25 g.

(2-4) The fluoropolymer obtained in (2-3) was molten by heating at 270° C. to form a film. The resulting film was measured for IR spectrum, and the results show that the polymer has $SO_3H$ in an amount of 10000 ppm of the mass of the polymer.

(3) Ion Exchange Treatment (3-1) A glass column (diameter: 10 cm, height: 50 cm) filled with pure water and cation-exchange resin beads was prepared, and 4400 g of the fluoropolymer aqueous dispersion obtained in (2-2) was passed therethrough. The passing rate of the fluoropolymer aqueous dispersion was 120 g/minute. The passing yielded 5000 g of a fluoropolymer aqueous dispersion containing approximately 25% by mass of a fluoropolymer. The obtained fluoropolymer aqueous dispersion was found to have a pH of 1.

(3-2) A 10-g portion of the fluoropolymer aqueous dispersion having been passed through the glass column, when combined with 5 g of a 10% by mass potassium hydroxide aqueous solution, turned slightly brownish white.

(3-3) The fluoropolymer aqueous dispersion having been passed through the glass column was measured for cation contents therein by atomic absorption spectrometry, and found to contain iron ions in an amount of 2000 ppb of the fluoropolymer aqueous dispersion.

(3-4) A 100-g portion of the fluoropolymer aqueous dispersion having been passed through the glass column was combined with 5 g of 60% by mass nitric acid to separate the fluoropolymer. The separated fluoropolymer was washed with pure water until the washes were neutral in pH, and the polymer was hot air-dried at 150° C. Thus, the fluoropolymer was recovered. The recovered fluoropolymer weighed approximately 20 g.

(3-5) The fluoropolymer obtained in (3-4) was molten by heating at 270° C. to form a film. The resulting film was treated in a 20% sodium hydroxide aqueous solution at 90° C. for 24 hours, and then washed with water. Subsequently, the film was treated in 6 N sulfuric acid at 60° C. for 24 hours. The film was washed with water until the washes were neutral in pH. The film was then sufficiently dried at 110° C., thereby providing a membrane for a stability test made of a fluoropolymer having a sulfo group converted from the $SO_2F$.

(3-6) In a bottle made of a tetrafluoroethylene/perfluoro (alkyl vinyl ether) copolymer, 1 mg of $FeSO_4 \cdot 7H_2O$ was dissolved in 20 ml of a 30% hydrogen peroxide aqueous solution, and a 3-g sample of the membrane for a stability test was immersed in the solution and maintained at 85° C. for 20 hours. Thereafter, the bottle was cooled to room temperature, and the membrane for a stability test was taken out and measured for the fluorine ion concentration in the liquid phase with a fluorine ion meter. The fluorine ion concentration was found to be 50 ppm.

The invention claimed is:

1. A method for preparing a fluoropolymer aqueous dispersion, comprising:
    step (A) of preparing a fluoropolymer aqueous dispersion comprising a fluoropolymer having at least one selected from the group consisting of —$SO_2Y$ and —COOR, wherein Y is a halogen, and R is a $C_1$ to $C_4$ alkyl, by emulsion polymerization;
    step (B) of heating the fluoropolymer aqueous dispersion to 50° C. or higher; and
    step (C) of contacting the fluoropolymer aqueous dispersion with an ion exchange resin for cation exchange after step (B), thereby providing a purified fluoropolymer aqueous dispersion,
    the fluoropolymer aqueous dispersion being adjusted to pH 7 or lower from the end of the polymerization in step (A) to the end of step (C).

2. The method for preparing a fluoropolymer aqueous dispersion according to claim 1,
    wherein the heating in step (B) is continued for 1 hour or more.

3. The method for preparing a fluoropolymer aqueous dispersion according to claim 1,
    wherein the heating of the fluoropolymer aqueous dispersion to 50° C. or higher in step (B) is performed in such a manner as to lower the pH of the fluoropolymer aqueous dispersion to 2 or lower.

4. The method for preparing a fluoropolymer aqueous dispersion according to claim 1,
    wherein the purified fluoropolymer aqueous dispersion obtained in step (C) contains iron ions in an amount of not more than 1000 ppb of the dispersion.

5. The method for preparing a fluoropolymer aqueous dispersion according to claim 1,
    wherein the fluoropolymer includes units derived from a fluoromonomer represented by the following formula (I):

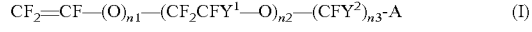

$$CF_2=CF-(O)_{n1}-(CF_2CFY^1-O)_{n2}-(CFY^2)_{n3}-A \qquad (I)$$

wherein $Y^1$ is a halogen or perfluoroalkyl, n1 is an integer of 0 or 1, n2 is an integer of 0 to 3, $Y^1$ groups may be the same or different, $Y^2$ is a halogen, n3 is an integer of 1 to 8, $Y^2$ groups may be the same or different, and A is —$SO_2Y$ or —COOR, wherein Y is a halogen, and R is a $C_1$ to $C_4$ alkyl.

6. The method for preparing a fluoropolymer aqueous dispersion according to claim 5,
    wherein the fluoropolymer is a binary or multicomponent copolymer including units derived from a fluoromonomer represented by the formula (I) and units derived from another fluoroethylenic monomer.

7. The method for preparing a fluoropolymer aqueous dispersion according to claim 6,
    wherein the fluoroethylenic monomer is at least one monomer represented by the following formula (II):

$$CF_2=CF-R_f^1 \qquad (II)$$

wherein $R_f^1$ is fluorine, chlorine, $R_f^2$ or $OR_f^2$, $R_f^2$ is a $C_1$ to $C_9$ linear or branched perfluoroalkyl optionally having an ether bond.

8. The method for preparing a fluoropolymer aqueous dispersion according to claim 7,
    wherein the at least one monomer represented by the formula (II) is or includes tetrafluoroethylene.

9. The method for preparing a fluoropolymer aqueous dispersion according to claim 5,
wherein in the formula (I), $Y^1$ is trifluoromethyl, $Y^2$ is fluorine, n1 is 1, n2 is 0 or 1, and n3 is 2.

* * * * *